US012051954B2

(12) United States Patent
Veronesi et al.

(10) Patent No.: US 12,051,954 B2
(45) Date of Patent: Jul. 30, 2024

(54) PREFORMED COIL ASSEMBLY FOR A STATOR OF AN ELECTRIC MOTOR, COMPRISING COIL CENTERING INSULATION FILMS

(71) Applicant: ETEL S.A., Môtiers (CH)

(72) Inventors: Daniele Veronesi, Corcelles (CH); Johann Pourchet, La Chaux de Gilley (FR)

(73) Assignee: ETEL S.A., Môtiers (CH)

( * ) Notice: Subject to any disclaimer, the term of this patent is extended or adjusted under 35 U.S.C. 154(b) by 287 days.

(21) Appl. No.: 17/724,917

(22) Filed: Apr. 20, 2022

(65) Prior Publication Data
US 2022/0352778 A1    Nov. 3, 2022

(30) Foreign Application Priority Data
Apr. 28, 2021    (EP) .................................... 21170843

(51) Int. Cl.
*H02K 3/52*    (2006.01)
*H02K 1/14*    (2006.01)
*H02K 15/02*    (2006.01)

(52) U.S. Cl.
CPC ............ *H02K 3/522* (2013.01); *H02K 1/146* (2013.01); *H02K 15/022* (2013.01); *H02K 2203/12* (2013.01)

(58) Field of Classification Search
CPC .......... H02K 1/146; H02K 3/345; H02K 3/32; H02K 3/522; H02K 3/34; H02K 15/022;
(Continued)

(56) References Cited

U.S. PATENT DOCUMENTS

| 4,922,165 A | * | 5/1990 | Crawford | ............... | H02K 15/12 |
| | | | | | 310/216.015 |
| 8,610,328 B2 | * | 12/2013 | Yoshida | ................. | H02K 3/522 |
| | | | | | 310/194 |

(Continued)

FOREIGN PATENT DOCUMENTS

| DE | 102011081030 A1 | 2/2013 |
| EP | 3203613 A2 | 8/2017 |

(Continued)

OTHER PUBLICATIONS

Machine Translation of Ozeki 2003 (Year: 2003).*
Machine Translation of Hasegawa 2018 (Year: 2018).*
European Search Report issued in corresponding EP Application No. 21170843.3 dated Oct. 5, 2021, pp. 1-3.

*Primary Examiner* — Quyen P Leung
*Assistant Examiner* — Charlie Frank Mann, Jr.
(74) *Attorney, Agent, or Firm* — Carter, DeLuca & Farrell LLP (57) ABSTRACT

A preformed coil assembly for a stator of an electric motor includes first and second winding carriers located on respective opposite ends of the preformed coil assembly and a winding part wound around the winding carriers to form first and second elongated winding portions with an elongated opening therebetween to be fitted around a tooth of a stator. The preformed coil assembly includes first and second insulation films disposed around the first and second winding portions. Each insulation film includes upper and lower folded portions resting against first and second opposite walls of respective winding carriers to provide first and second distances between respective opposite lateral sides of the tooth and a corresponding non-folded portion of respective first and second insulation films. The first and second distances are equal so that the preformed coil assembly is centered with respect to the tooth when mounted therearound.

20 Claims, 5 Drawing Sheets

(58) Field of Classification Search
CPC ...... H02K 15/12; H02K 15/10; H02K 15/105; H02K 2203/12
USPC ........................................................ 310/215
See application file for complete search history.

(56) References Cited

U.S. PATENT DOCUMENTS

| | | | |
|---|---|---|---|
| 9,455,606 B2* | 9/2016 | Ewert | H02K 3/345 |
| 11,289,966 B2 | 3/2022 | Pourchet et al. | |
| 2007/0222323 A1* | 9/2007 | Neet | H02K 3/345 |
| | | | 310/215 |
| 2015/0311761 A1* | 10/2015 | Hattori | H01B 3/52 |
| | | | 310/215 |
| 2017/0222513 A1* | 8/2017 | Lee | H02K 3/345 |
| 2020/0136456 A1* | 4/2020 | Pourchet | H02K 3/34 |

FOREIGN PATENT DOCUMENTS

| | | | |
|---|---|---|---|
| EP | 3648312 A1 | | 5/2020 |
| JP | 2003-061286 A | | 2/2003 |
| JP | 2003061286 A | * | 2/2003 |
| JP | 2008-206322 A | | 9/2008 |
| JP | 2017-188981 A | | 10/2017 |
| JP | 2018-078749 A | | 5/2018 |
| JP | 2018078749 A | * | 5/2018 |
| JP | 2019-062681 A | | 4/2019 |

* cited by examiner

PREFORMED COIL ASSEMBLY FOR A STATOR OF AN ELECTRIC MOTOR, COMPRISING COIL CENTERING INSULATION FILMS

CROSS-REFERENCE TO RELATED APPLICATIONS

The present application claims priority to Application No. 21170843.3, filed in the European Patent Office on Apr. 28, 2021, which is expressly incorporated herein in its entirety by reference thereto.

FIELD OF THE INVENTION

The present invention relates to a preformed coil assembly for a stator of an electric motor. The preformed coil assembly includes, for example, coil centering insulation films to center the coil assembly with respect to a tooth of a stator when mounted thereon. The present invention also relates to a method of manufacturing a preformed coil assembly and to an electric motor, which includes, for example, preformed coil assemblies mounted on respective teeth of the stator.

BACKGROUND INFORMATION

Figure 1:
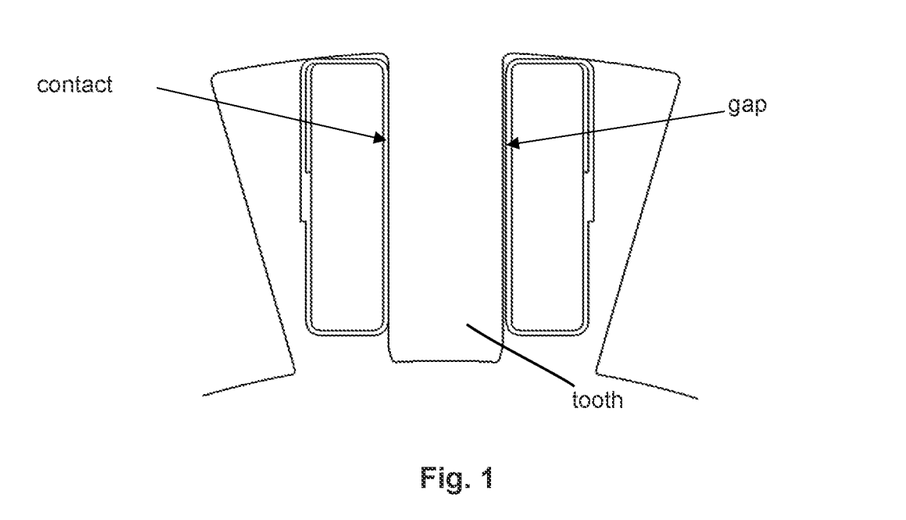
FIG. 1 is a cross-sectional view of a tooth of a stator with a preformed coil assembly mounted therearound asymmetrically with respect to the tooth.

Accurate positioning of preformed coil assemblies on corresponding laminated teeth of a stator of an electric motor is difficult to achieve. In general, each preformed coil assembly is manually positioned with respect to a corresponding tooth during the assembly of the motor. Consequently, the preformed coil assembly is usually not centered and tends to lean against one side or the other side of the tooth as illustrated in FIG. 1.

Figure 2:
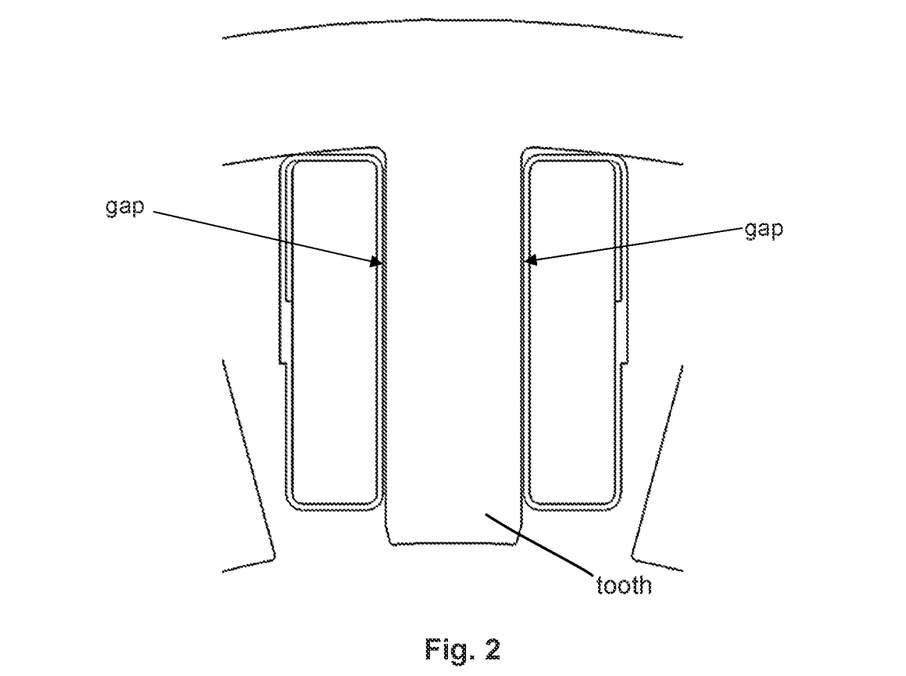
FIG. 2 is a cross-sectional view of a tooth of a stator with a preformed coil assembly mounted therearound symmetrically with respect to the tooth.

From a dielectric insulation point of view, each preformed coil assembly should be centered with respect to the corresponding tooth and leave a small gap on both sides of the tooth as illustrated in FIG. 2. The dielectric insulation of motors is heavily linked to the physical interface between the performed coil assemblies and the corresponding teeth of the stator. The symmetry of the gaps on both sides of the tooth improves dramatically the dielectric insulation of the motor and its lifetime when subjected to high voltages as these gaps are filled with insulating liquid compound during a vacuum potting process. Conversely, any asymmetry between the gaps on both sides of each tooth would have an adverse effect on insulation of the motor and its lifetime.

Figure 3:
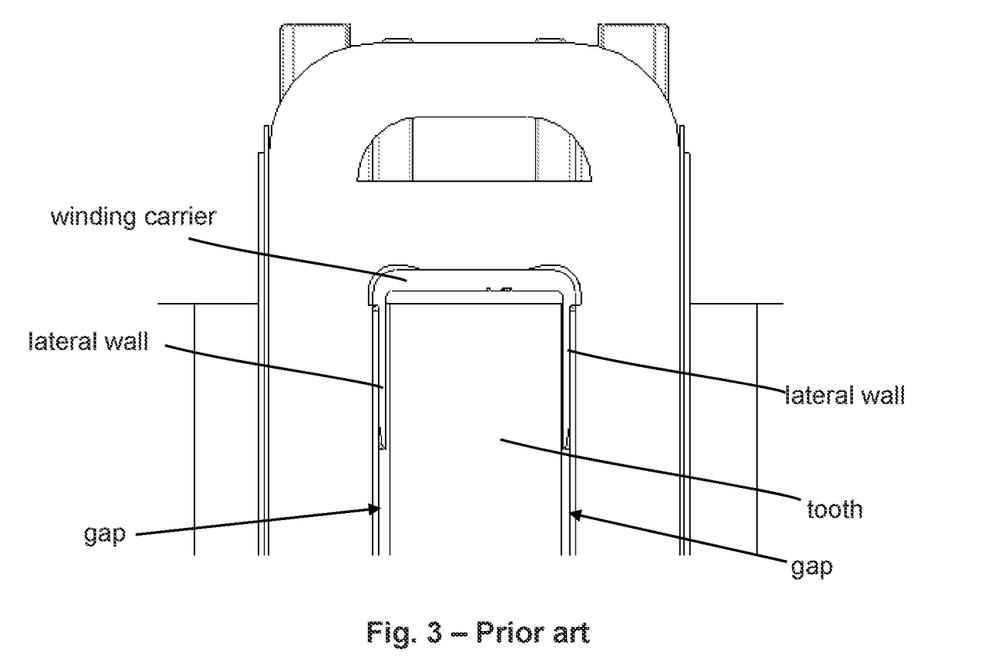
FIG. 3 is a front view of an upper portion of a preformed coil assembly mounted on a stator tooth, according to the prior art.

The gaps between opposite sides of a tooth of a stator and a corresponding preformed coil assembly mounted on the tooth may be defined the by thickness of the two opposite lateral walls of a winding carrier of the preformed coil assembly as illustrated in FIG. 3. German Patent Document No. 10 2011 081 030 describes an example of such winding carrier.

The problem with the winding carrier of FIG. 3 stems from the fact that the thickness of its opposite lateral walls defines the thickness of the gap itself. From a dielectric point of view, the gap should be big, but from a performance point of view, the gap must be small to maximize the copper filling factor and the heat dissipation. The best compromise is to have a winding carrier with opposite lateral walls having each a very small and identical thickness.

In order to achieve this thickness, the methodology for producing the winding carrier has to be based on injection technology. Accordingly, the effort in terms of time and the cost to make a new winding carrier is very high. For prototype motors and small series, it is not possible to create a new winding carrier at a reasonable cost. In addition, opposite thin lateral walls of the winding carrier in the core of the coils limits the process of winding in terms of winding speed and tension on the copper wire during winding of orthocyclic coils, as excessive speed and tension may break the lateral walls which are typically made out of glass reinforced polymer.

SUMMARY

Example embodiments of the present invention provide a preformed coil assembly, which may eliminate or at least mitigate the above disadvantages.

Example embodiments of the present invention provide a preformed coil assembly that is cost effective to manufacture.

Example embodiments of the present invention provide a preformed coil assembly, which includes winding carriers that are robust enough to withstand the tension applied by the copper wire during winding of orthocyclic coils.

According to an example embodiment of the present invention, a preformed coil assembly for a stator of an electric motor, includes a first winding carrier and a second winding carrier located on respective opposite ends of the preformed coil assembly, and a winding part wound around the first and second winding carriers to form a first elongated winding portion and a second elongated winding portion with an elongated opening therebetween to be fitted around a tooth of a stator. The tooth includes two opposite lateral sides. The preformed coil assembly further includes a first insulation film and a second insulation film disposed around respectively the first and second winding portions. Each of the first and second insulation films includes an upper folded portion and a lower folded portion, each having a superposed insulation film portion. One side of each superposed film insulation portion rests against a corresponding portion of the insulating film on an inner side of respective first and second winding portions. The other side of each superposed insulation film portion rests against respective first and second opposite walls of respective winding carriers to provide a first distance and a second distance between respective opposite lateral sides of the tooth and a corresponding non-folded portion of respective first and second insulation films. The first and second distances are equal so that the preformed coil assembly is centered with respect to the corresponding tooth when mounted therearound.

According to example embodiments, each of the first and second distances is between 0.2 mm and 0.4 mm.

According to example embodiments, each of the first and second distances is substantially equal to 0.3 mm.

According to example embodiments, the thickness of each of the first and second insulation films in the unfolded region ranges between 0.2 mm and 0.4 mm and is, for example, substantially equal to 0.3 mm. The thickness of the film in the upper and lower folded portions ranges between 0.4 mm and 0.8 mm and is, for example, substantially equal to 0.6 mm. The thickness of each superposed film insulation portion ranges between 0.2 mm and 0.4 mm and is, for example, equal to 0.3 mm.

According to example embodiments, each of the first and second winding carriers includes a distal winding portion and a base portion including the first and second opposite lateral walls. The lower portion of the distal winding portion adjoining the base portion is wider than the base portion with protections extending perpendicularly to respective opposite lateral walls of the base portion to a distal end, such that a folded region of each of the first and the second insulation films lies against the corresponding projections, e.g., against a flat surface thereof.

According to example embodiments, the distance between each of the opposite lateral walls and the distal end of the corresponding projections is substantially equal to the thickness of the corresponding folded portions of the corresponding insulation film.

According to example embodiments, the distance is substantially equal to 0.6 mm.

According to example embodiments, the distal winding portion of each of the first and second winding carriers includes two opposite lateral walls resting against a corresponding portion of the first and second elongated winding portions which is not covered with any insulation film.

According to an example embodiment of the present invention, a stator for an electric motor, e.g., a rotary electric motor, includes a plurality of teeth and a corresponding plurality of preformed coil assemblies mounted around the plurality of teeth. The distance between respective opposite lateral sides of each tooth and the corresponding non-folded portion of respective first and second insulation film forms a gap on both sides of each tooth filled with an insulating resin.

According to an example embodiment of the present invention, an electric motor, e.g., a rotary electric motor, includes the stator described herein.

According to an example embodiment of the present invention, a method of manufacturing a preformed coil assembly includes: mounting a first winding carrier and a second winding carrier on respective ends of a winding carrier support, in which each winding carrier includes a distal winding portion and a base portion including two opposite lateral walls, the lower portion of the distal winding portion adjoining the base portion being wider than the base portion, thereby forming first and second series of protections extending perpendicularly to respective opposite lateral walls; providing a first insulating film and a second insulation film and folding two opposite portions of each of the first and second insulation films; applying each folded portion against respective two opposite lateral walls of respective first and second winding carriers, in which a folding region lies against a flat surface of respective first and second series of projections of the corresponding winding carrier; turning a wire winding around the first and second winding carriers to obtain a winding part wound around the first and second winding carriers, to form a first elongated winding portion and a second elongated winding portion with an elongated opening therebetween; and wrapping the first and second insulation films around respective first and second elongated winding portions.

Further features and aspects of example embodiments of the present invention are described in more detail below with reference to the appended schematic Figures.

DETAILED DESCRIPTION

FIG. 1 illustrates a preformed coil assembly mounted on a tooth of a stator asymmetrically with respect to the tooth while FIG. 2 illustrates a preformed coil assembly as described thereafter mounted symmetrically with respect to the tooth to improve dramatically the dielectric insulation of the motor and its lifetime when subjected to high voltages.

Figure 4:
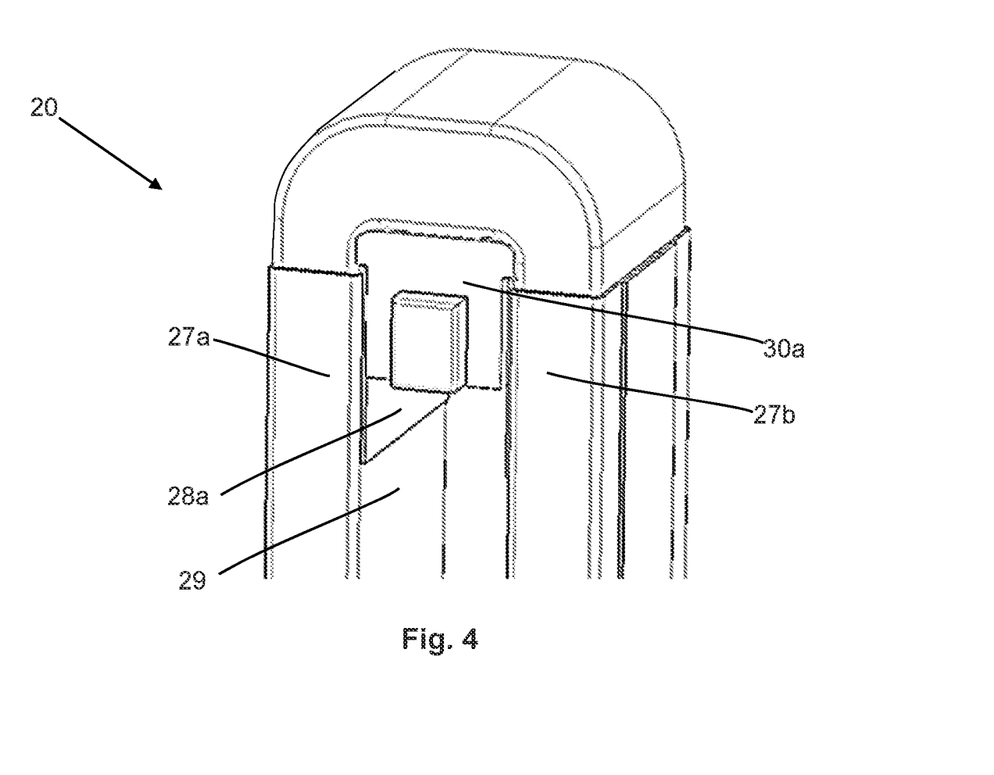
FIG. 4 is a perspective view of an upper portion of a preformed coil assembly according to an example embodiment of the present invention.
Figure 5:
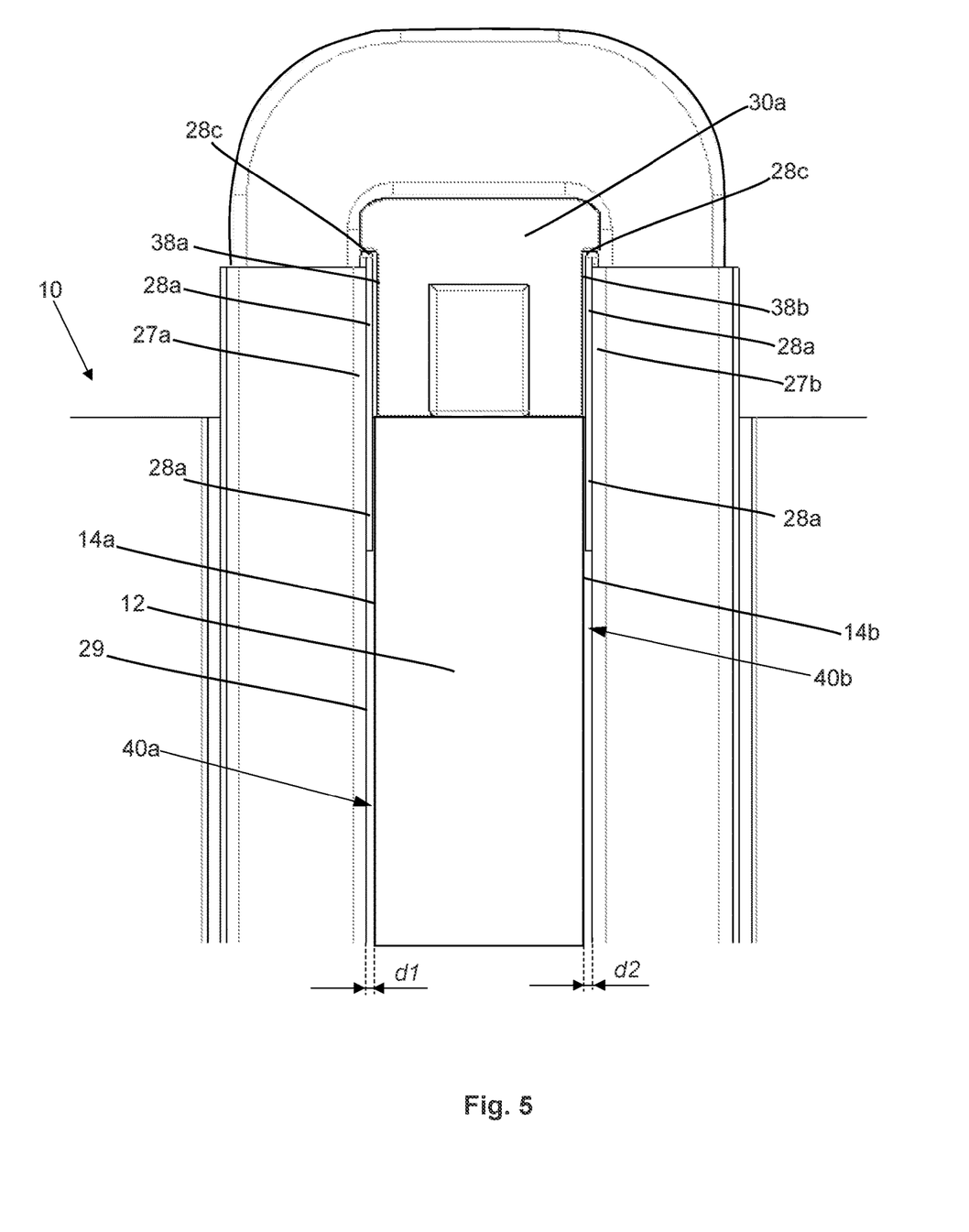
FIG. 5 is a front view of the upper portion of the preformed coil assembly illustrated FIG. 4 mounted on a stator tooth.

Referring to FIGS. 4 to 7, the preformed coil assembly 20 includes first and second winding carriers 30a, 30b located on respective opposite ends of the preformed coil assembly 20, a winding part 22 wound around the first and second winding carriers 30a, 30b to form first and second elongated winding portions 24a, 24b with an elongated opening 26 therebetween to be fitted around a tooth 12 of a stator 10, as illustrated in FIG. 5.

The preformed coil assembly 20 further includes first and second insulation films 27a, 27b, as illustrated in FIG. 4. One insulation film 27a is wrapped around one elongated winding portion 24a, and the other insulation film 27b is wrapped around the other elongated winding portion 24b. Each insulation film 27a, 27b includes upper and lower folded portions 28a, 28b and a non-folded portion 29 therebetween. Each folded portion 28a, 28b includes a superposed insulation film portion. The thickness of folded portion 28a, 28b is twice the thickness of the non-folded portion 29.

Figures 8, 9, 10:
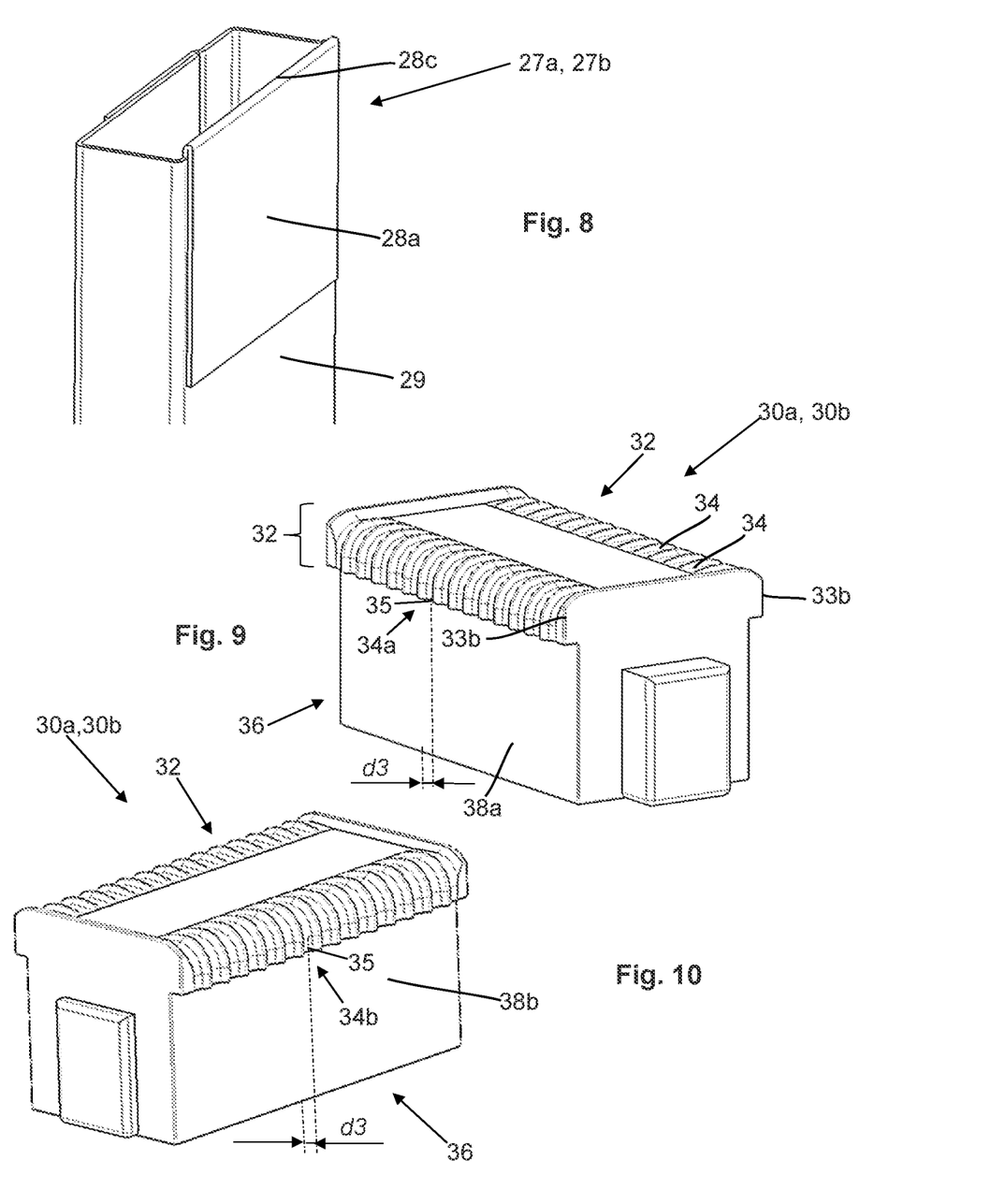
FIG. 8 is a perspective view of an upper portion of one of the two insulation films of the preformed coil assembly illustrating a folded portion.
FIG. 9 is a perspective view one of two winding carriers of the preformed coil assembly illustrated in FIG. 7.
FIG. 10 is a perspective view of the winding carrier illustrated in FIG. 9 taken from another angle.

As illustrated in FIGS. 9 and 10, each winding carrier 30a, 30b includes a distal winding portion 32 and a base portion 36. The base portion 36 of each winding carrier 30a, 30b includes two opposite lateral walls 38a, 38b, and a bottom side 39, as illustrated in FIGS. 6 and 7, adapted to be snapped respectively on the upper and lower sides of a tooth 12 of the stator 10.

Figures 6, 7:
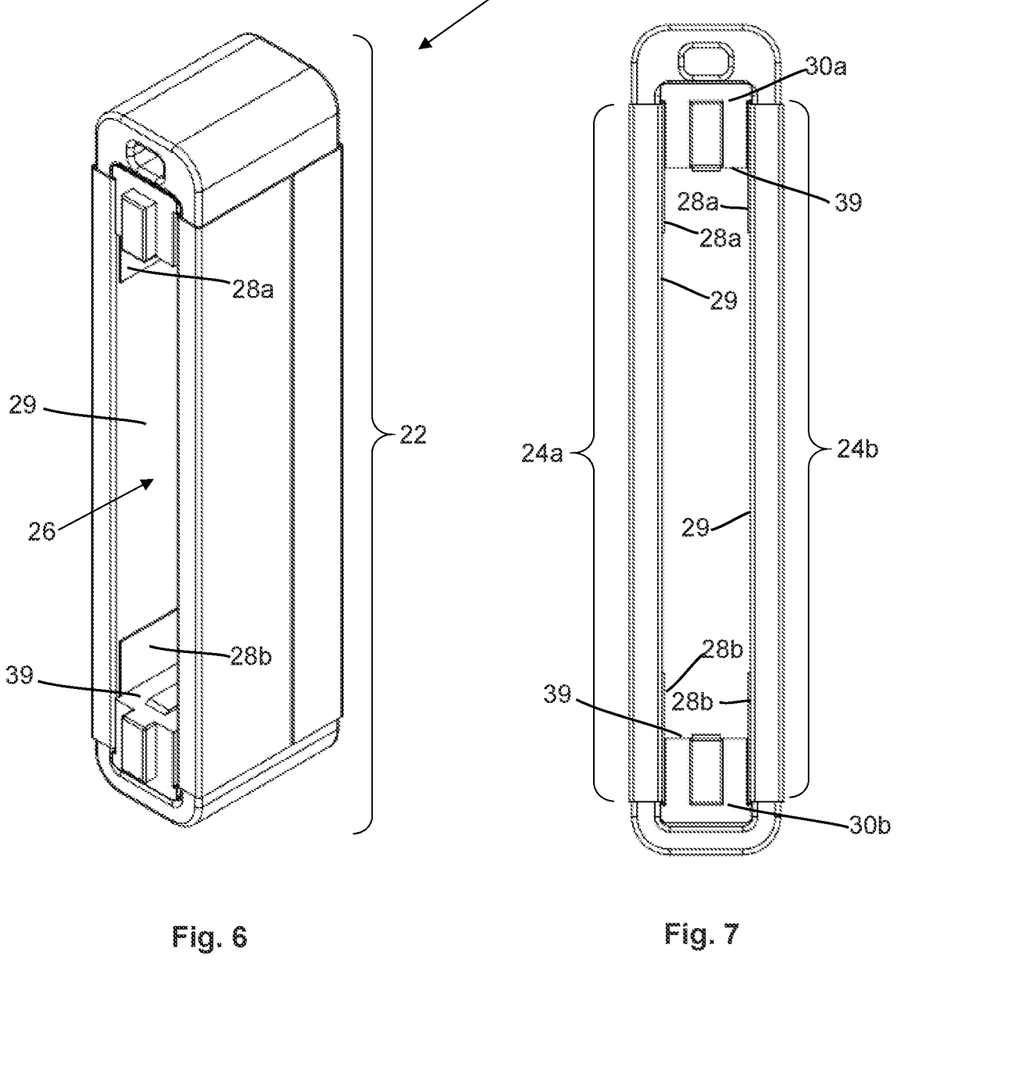
FIG. 6 is a perspective view of the preformed coil assembly illustrated in FIG. 4.
FIG. 7 is a front view of the preformed coil assembly illustrated in FIG. 6.

Referring to FIGS. 5 to 7, one side of the superposed insulation film portion of each upper and lower folded portion rests against a corresponding portion of the insulating film 27a, 27b on an inner side of respective first and second winding portions 24a, 24b, whereas the other side of each superposed insulation film portion of the corresponding insulation film 27a, 27b rests against the respective two opposite lateral walls 38a, 38b of respective winding carriers 30a, 30b.

As illustrated in FIGS. 9 and 10, the distal winding portion of each of the first and second winding carriers 30a, 30b is provided with adjacent grooves 34 for guiding the winding direction of the electrical conductor forming the winding during the winding process. Preformed coil assemblies 20 are pushed radially on corresponding teeth 12 of the stator 10 (see, FIG. 5).

The lower portion of the distal winding portion 32 adjoining the base portion 36 is wider than the base portion 36 forming a first and a second series of protections 34a, 34b extending perpendicularly to respective opposite lateral walls 38a, 38b and having a distal end 35 corresponding to the bottom of any adjacent groove 34 such that a folded region 28c of each of the first and the second insulation films 27a, 27b is arranged against the corresponding series of projections 34a, 34b (see, FIG. 5), e.g., against a flat surface thereof.

More particularly, the distance d3 indicated in FIGS. 9 and 10 extending from one lateral wall 38b and the corresponding distal end 35 is equal to the thickness of the corresponding folded portions 28a of the corresponding insulation film 27a, 27b, as illustrated in FIG. 5. The folded portion 28a of each insulation film creates first and second gaps 40a, 40b of the same width between the respective two opposite sides 14a, 14b of the tooth 12 and a non-folded portion 29 of respective insulation film thereby providing that the performed coil assembly is symmetrically center with respect to the tooth 12.

The thickness of the first and second insulation films 27a, 27b, in the non-folded region 29 is between 0.2 mm and 0.4 mm and is, for example, approximately 0.3 mm so as to create first and second gaps, each having an identical width ranging between 0.2 mm and 0.4 mm and, for example, approximately 0.3 mm.

The preformed coil assembly 20 is formed by a winding process, which includes placing the first and second winding carriers 30a, 30b on both ends of a rectangular metallic support with the same shape of a tooth of the stator. The wire turns are wound in layers by a winding machine around the first and second winding carriers 30a, 30b. The wire turns may be wound, for example, by placing the next layer shifted by half the wire diameter to lay the wires in a hexagonal mesh.

After self-alignment of all preformed coil assemblies 20 with the corresponding teeth 12 of the stator 10 and once all the electric connections are done, a potting operation is performed, which includes placing the stator in a potting mold into which a synthetic resin is injected (e.g., under vacuum) that hardens, permanently protecting the assembly, e.g., against shock, vibration, water infiltration, moisture, etc.

The synthetic resin fills up the first and second gaps 40a, 40b between each tooth 12 and the non-folded portion 29 of respective first and second insulation films 27a, 27b of each preformed coil assembly, thereby improving dramatically the dielectric insulation of the motor and its lifetime when subjected to high voltages.

LIST OF REFERENCE CHARACTER

10 Stator
12 Tooth 12
14a, 14b Opposite lateral sides
20 Preformed coil assembly
22 Winding part
24a, 24b First and second winding portion
26 Elongated opening
27a, 27b First and second insulation films
28a, 28b Folded portions
28c Folded region
29 Non-folded portion
30a, 30b First and second winding carriers
32 Distal winding portion
33a, 33b Opposite lateral walls
34 Adjacent grooves
34a, 34b First and second projections
35 Distal end
36 Base portion
38a, 38b Opposite lateral walls
39 Front side
40a, 40b Gaps
d1, d2 First and second distances

What is claimed is:

1. A preformed coil assembly for a stator of an electric motor, the stator including a tooth having a first lateral side opposite a second lateral side, comprising:
  a first winding carrier and a second winding carrier located on respective opposite ends of the preformed coil assembly, each winding carrier including a first wall and a second wall opposite the first wall;
  a winding part wound around the first and second winding carriers to form a first elongated winding portion, a second elongated winding portion, and an elongated opening between the first and second elongated winding portions adapted to be fitted around the tooth of the stator;
  a first insulation film arranged around the first winding portion and including a first upper folded portion and a first lower folded portion; and
  a second insulation film arranged around the second winding portion and including a second upper folded portion and a second lower folded portion;
  wherein the first upper folded portion includes a first upper superposed insulation film portion, a first side of the first upper superposed insulation film portion resting against a first corresponding portion of the first insulation film on an inner side of the first winding portion and a second side of the first upper superposed insulation film portion resting against the first wall of the first winding carrier;
  wherein the first lower folded portion includes a first lower superposed insulation film portion, a first side of the first lower superposed insulation film portion resting against a second corresponding portion of the first insulation film on the inner side of the first winding portion and a second side of the first lower superposed insulation film portion resting against the first wall of the second winding carrier;
  wherein the second upper folded portion includes a second upper superposed insulation film portion, a first side of the second upper superposed insulation film portion resting against a first corresponding portion of the second insulation film on an inner side of the second winding portion and a second side of the second upper superposed insulation film portion resting against the second wall of the first winding carrier;
  wherein the second lower folded portion includes a second lower superposed insulation film portion, a first side of the second lower superposed insulation film portion resting against a second corresponding portion of the second insulation film on the inner side of the second winding portion and a second side of the second lower superposed insulation film portion resting against the second wall of the second winding carrier;
  wherein a first distance between the first lateral side of the tooth and a non-folded portion of the first insulation film and a second distance between the second lateral side of the tooth and a non-folded portion of the second insulation film are equal to center the preformed coil assembly with respect to the tooth in a mounted state of the preformed coil assembly around the tooth.

2. The preformed coil assembly according to claim 1, wherein the first distance and the second distance are between 0.2 mm and 0.4 mm.

3. The preformed coil assembly according to claim 1, wherein the first distance and the second distance is substantially equal to 0.3 mm.

4. The preformed coil assembly according to claim 1, wherein a thickness of the first insulation film and the second insulation film in the non-folded portion is between 0.2 mm and 0.4 mm.

5. The preformed coil assembly according to claim 4, wherein a thickness of the first insulation film and the second insulation film in the folded portion is between 0.4 and 0.8 mm.

6. The preformed coil assembly according to claim 1, wherein a thickness of the first insulation film and the second insulation film in the non-folded portion is substantially equal to 0.3 mm.

7. The preformed coil assembly according to claim 6, wherein a thickness of the first insulation film and the second insulation film in the folded portion is substantially equal to 0.6 mm.

8. The preformed coil assembly according to claim 7, wherein a thickness of each superposed insulation film portion is substantially equal to 0.3 mm.

9. The preformed coil assembly according to claim 1, wherein a thickness of the first insulation film and the second insulation film in the folded portion is between 0.4 and 0.8 mm.

10. The preformed coil assembly according to claim 1, wherein a thickness of the first insulation film and the second insulation film in the folded portion is substantially equal to 0.6 mm.

11. The preformed coil assembly according to claim 1, wherein a thickness of each superposed insulation film portion is substantially equal to 0.3 mm.

12. The preformed coil assembly according to claim 1, wherein each winding carrier includes a distal winding portion and a base portion including the first and second walls, a lower portion of the distal winding portion adjoining the base portion being wider than the base portion, protections extending perpendicularly to the first and second walls of the base portion to a distal end, a folded region of each of the first and the second insulation films abutting against a corresponding projection.

13. The preformed coil assembly according to claim 12, wherein a third distance between the first and second walls and the distal end of the corresponding projections is substantially equal to the thickness of the corresponding folded portion of the corresponding insulation film.

14. The preformed coil assembly according to claim 13, wherein the third distance is substantially equal to 0.6 mm.

15. The preformed coil assembly according to claim 1, wherein each winding carrier includes a distal winding portion and a base portion including the first and second walls, a lower portion of the distal winding portion adjoining the base portion being wider than the base portion, protections extending perpendicularly to the first and second walls of the base portion to a distal end, a folded region of each of the first and the second insulation films abutting against a flat surface of a corresponding projection.

16. The preformed coil assembly according to claim 1, wherein the distal winding portion includes two opposite lateral walls resting against a corresponding portion the first and second elongated winding portions that is not covered with any insulation film.

17. A stator for an electric motor, comprising:
a plurality of teeth; and
a plurality of preformed coil assemblies as recited in claim 1, each preformed coil assembly mounted around a corresponding tooth;
wherein the first distance between the first lateral side of each tooth and the non-folded portion of the first insulation film of the corresponding tooth forms a first gap on a first side of the corresponding tooth and the second distance between the second lateral side of each tooth and the non-folded portion of the second insulation film of the corresponding tooth forms a second gap on a second side of each tooth, the first gap and the second gap being filled with an insulating resin.

18. An electric motor, comprising the stator as recited in claim 17.

19. The electric motor according to claim 18, wherein the electric motor is arranged as a rotary electric motor.

20. A method of manufacturing the preformed coil assembly as recited in claim 1, comprising:
mounting the first winding carrier and the second winding carrier on respective ends of a winding carrier support, each winding carrier including a distal winding portion and a base portion having two opposite lateral walls, a lower portion of the distal winding portion adjoining the base portion being wider than the base portion, a first series of projections extending perpendicular to a first one of the two opposite lateral walls and second series of protections extending perpendicularly to a second one of the two opposite lateral walls;
folding two opposite portions of each of the first insulation film and the second insulation film to form the first upper folded portion, the first lower folded portion, the second upper folded portion, and the second lower folded portion;
applying the first upper folded portion against the first wall of the first winding carrier and against the first series of projections of the first winding carrier, the first lower folded portion against the first wall of the second winding carrier and against the first series of projections of the second winding carrier, the second upper folded portion against the second wall of the first winding carrier and against the second series of projections of the first winding carrier, and the second lower folded portion against the second wall of the second winding carrier and against the second series of projections of the second winding carrier;
turning a wire winding around the first and second winding carriers to form the winding part wound around the first and second winding carriers and to form the first and second elongated winding portions with the elongated opening between the first and second elongated winding portions; and
wrapping the first insulation film around the first winding portion and the second insulation film around the second winding portion.

* * * * *